US009467807B2

(12) United States Patent
Alizadeh-Shabdiz

(10) Patent No.: US 9,467,807 B2
(45) Date of Patent: *Oct. 11, 2016

(54) ESTIMATING DEMOGRAPHICS ASSOCIATED WITH A SELECTED GEOGRAPHIC AREA

(71) Applicant: Skyhook Wireless, Inc., Boston, MA (US)

(72) Inventor: Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,818

(22) Filed: May 8, 2015

(65) Prior Publication Data

US 2015/0245175 A1    Aug. 27, 2015

Related U.S. Application Data

(63) Continuation of application No. 14/073,952, filed on Nov. 7, 2013, now Pat. No. 9,031,580, which is a continuation of application No. 13/252,685, filed on Oct. 4, 2011, now Pat. No. 8,606,294.

(60) Provisional application No. 61/389,834, filed on Oct. 5, 2010.

(51) Int. Cl.
*H04W 24/00* (2009.01)
*H04W 4/02* (2009.01)
(Continued)

(52) U.S. Cl.
CPC ............... *H04W 4/021* (2013.01); *H04W 4/02* (2013.01); *H04W 4/028* (2013.01); *H04W 8/16* (2013.01); *H04W 12/02* (2013.01)

(58) Field of Classification Search
CPC ....... H04W 24/00; H04W 4/02; H04W 8/16; H04W 12/02

USPC ...................... 370/338, 246; 455/41.2, 456.1
See application file for complete search history.

(56) References Cited

U.S. PATENT DOCUMENTS 4,415,771 A    11/1983  Martinez
4,991,176 A     2/1991  Dahbura et al.
(Continued)

FOREIGN PATENT DOCUMENTS

WO    WO-2004/036240    4/2004
WO    WO-2007/081356    7/2007
(Continued)

OTHER PUBLICATIONS

Curran, et al., "Pinpointing Users with Location Estimation Techniques and Wi-Fi Hotspot Technology," International Journal of Network Management, 2008, DOI: 10.1002/nem.683, 15 pages.
(Continued)

*Primary Examiner* — David Q Nguyen
(74) *Attorney, Agent, or Firm* — Cesari and McKenna, LLP; James A. Blanchette

(57) ABSTRACT

In one embodiment, demographics associated with a selected geographic area may be estimated using visitor demographics. For each mobile device of a plurality of mobile devices, a more recent location estimate of the mobile device determined by a positioning system that is within the selected geographic area may be associated with a previous location estimate of the mobile device determined by the positioning system. Origin geographic areas that include the previous location estimates are determined. Demographics associated with the selected geographic area may be estimated based at least in part on demographics associated with the origin geographic areas of the plurality of mobile devices.

22 Claims, 6 Drawing Sheets

(51) Int. Cl.
*H04W 8/16* (2009.01)
*H04W 12/02* (2009.01)

(56) References Cited

U.S. PATENT DOCUMENTS

| | | |
|---|---|---|
| 5,315,636 A | 5/1994 | Patel |
| 5,564,121 A | 10/1996 | Chow et al. |
| 5,940,825 A | 8/1999 | Castelli et al. |
| 5,946,615 A | 8/1999 | Holmes et al. |
| 6,134,448 A | 10/2000 | Shoji et al. |
| 6,249,252 B1 | 6/2001 | Dupray |
| 6,262,741 B1 | 7/2001 | Davies |
| 6,272,405 B1 | 8/2001 | Kubota et al. |
| 6,438,491 B1 | 8/2002 | Farmer |
| 6,625,647 B1 | 9/2003 | Barrick, Jr. et al. |
| 6,665,658 B1 | 12/2003 | DaCosta et al. |
| 6,674,403 B2 | 1/2004 | Gray et al. |
| 6,678,611 B2 | 1/2004 | Khavakh et al. |
| 6,741,188 B1 | 5/2004 | Miller et al. |
| 6,757,518 B2 | 6/2004 | Spratt et al. |
| 6,789,102 B2 | 9/2004 | Gotou et al. |
| 6,799,049 B1 | 9/2004 | Zellner et al. |
| 6,862,524 B1 | 3/2005 | Nagda et al. |
| 6,888,811 B2 | 5/2005 | Eaton et al. |
| 6,915,128 B1 | 7/2005 | Oh |
| 6,956,527 B2 | 10/2005 | Rogers et al. |
| 6,978,023 B2 | 12/2005 | Dacosta |
| 7,042,391 B2 | 5/2006 | Meunier et al. |
| 7,120,449 B1 | 10/2006 | Muhonen et al. |
| 7,123,928 B2 | 10/2006 | Moeglein et al. |
| 7,167,715 B2 | 1/2007 | Stanforth |
| 7,167,716 B2 | 1/2007 | Kim et al. |
| 7,197,556 B1 | 3/2007 | Short et al. |
| 7,206,294 B2 | 4/2007 | Garahi et al. |
| 7,250,907 B2 | 7/2007 | Krumm et al. |
| 7,254,405 B2 | 8/2007 | Lin et al. |
| 7,271,765 B2 | 9/2007 | Stilp et al. |
| 7,305,245 B2 | 12/2007 | Alizadeh-Shabdiz et al. |
| 7,317,914 B2 | 1/2008 | Adya et al. |
| 7,323,991 B1 | 1/2008 | Eckert et al. |
| 7,397,424 B2 | 7/2008 | Houri |
| 7,403,762 B2 | 7/2008 | Morgan et al. |
| 7,414,988 B2 | 8/2008 | Jones et al. |
| 7,417,961 B2 | 8/2008 | Lau |
| 7,433,673 B1 | 10/2008 | Everson et al. |
| 7,433,694 B2 | 10/2008 | Morgan et al. |
| 7,471,954 B2 | 12/2008 | Brachet et al. |
| 7,474,897 B2 | 1/2009 | Morgan et al. |
| 7,493,127 B2 | 2/2009 | Morgan et al. |
| 7,502,620 B2 | 3/2009 | Morqan et al. |
| 7,515,578 B2 | 4/2009 | Alizadeh-Shabdiz et al. |
| 7,551,579 B2 | 6/2009 | Alizadeh-Shabdiz et al. |
| 7,551,929 B2 | 6/2009 | Alizadeh-Shabdiz et al. |
| 7,636,576 B1 | 12/2009 | Pfister et al. |
| 7,768,963 B2 | 8/2010 | Alizadeh-Shabdiz |
| 7,769,396 B2 | 8/2010 | Alizadeh-Shabdiz et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,916,661 B2 | 3/2011 | Alizadeh-Shabdiz et al. |
| 7,999,742 B2 | 8/2011 | Alizadeh-Shabdiz |
| 8,014,788 B2 | 9/2011 | Alizadeh-Shabdiz et al. |
| 8,019,357 B2 | 9/2011 | Alizadeh-Shabdiz et al. |
| 8,022,877 B2 | 9/2011 | Alizadeh-Shabdiz |
| 8,130,148 B2 | 3/2012 | Alizadeh-Shabdiz |
| 8,154,454 B2 | 4/2012 | Alizadeh-Shabdiz |
| 8,223,074 B2 | 7/2012 | Alizadeh-Shabdiz |
| 8,242,960 B2 | 8/2012 | Alizadeh-Shabdiz |
| 8,606,294 B2 | 12/2013 | Alizadeh-Shabdiz |
| 9,031,580 B2 * | 5/2015 | Alizadeh-Shabdiz ........ 370/338 |
| 2001/0053999 A1 | 12/2001 | Feinberg |
| 2002/0055956 A1 | 5/2002 | Krasnoiarov et al. |
| 2002/0080063 A1 | 6/2002 | Bloebaum et al. |
| 2002/0154056 A1 | 10/2002 | Gaal et al. |
| 2002/0173317 A1 | 11/2002 | Nykanen et al. |
| 2002/0184331 A1 | 12/2002 | Blight et al. |
| 2003/0043073 A1 | 3/2003 | Gray et al. |
| 2003/0069024 A1 | 4/2003 | Kennedy |
| 2003/0087647 A1 | 5/2003 | Hurst |
| 2003/0114206 A1 | 6/2003 | Timothy et al. |
| 2003/0125045 A1 | 7/2003 | Riley et al. |
| 2003/0146835 A1 | 8/2003 | Carter |
| 2003/0225893 A1 | 12/2003 | Roese et al. |
| 2004/0019679 A1 | 1/2004 | E et al. |
| 2004/0039520 A1 | 2/2004 | Khavakh et al. |
| 2004/0058640 A1 | 3/2004 | Root et al. |
| 2004/0068364 A1 | 4/2004 | Zhao et al. |
| 2004/0081133 A1 | 4/2004 | Smavatkul et al. |
| 2004/0087317 A1 | 5/2004 | Caci |
| 2004/0124977 A1 | 7/2004 | Biffar |
| 2004/0157624 A1 | 8/2004 | Hrastar |
| 2004/0162896 A1 | 8/2004 | Cen et al. |
| 2004/0193367 A1 | 9/2004 | Cline |
| 2004/0203847 A1 | 10/2004 | Knauerhase et al. |
| 2004/0203904 A1 | 10/2004 | Gwon et al. |
| 2004/0204063 A1 | 10/2004 | Van Erlach |
| 2004/0205234 A1 | 10/2004 | Barrack et al. |
| 2004/0263388 A1 | 12/2004 | Krumm et al. |
| 2005/0020266 A1 | 1/2005 | Backes et al. |
| 2005/0021781 A1 | 1/2005 | Sunder et al. |
| 2005/0037775 A1 | 2/2005 | Moeglein et al. |
| 2005/0043040 A1 | 2/2005 | Contractor |
| 2005/0055374 A1 | 3/2005 | Sato |
| 2005/0108306 A1 | 5/2005 | Martizano Catalasan |
| 2005/0136845 A1 | 6/2005 | Masuoka et al. |
| 2005/0164710 A1 | 7/2005 | Beuck |
| 2005/0192024 A1 | 9/2005 | Sheynblat |
| 2005/0227711 A1 | 10/2005 | Orwant et al. |
| 2005/0232189 A1 | 10/2005 | Loushine |
| 2005/0251326 A1 | 11/2005 | Reeves |
| 2006/0002326 A1 | 1/2006 | Vesuna |
| 2006/0009235 A1 | 1/2006 | Sheynblat et al. |
| 2006/0040640 A1 | 2/2006 | Thompson et al. |
| 2006/0046709 A1 | 3/2006 | Krumm et al. |
| 2006/0058957 A1 | 3/2006 | Hickenlooper et al. |
| 2006/0058958 A1 | 3/2006 | Galbreath et al. |
| 2006/0061476 A1 | 3/2006 | Patil et al. |
| 2006/0078122 A1 | 4/2006 | Dacosta |
| 2006/0089157 A1 | 4/2006 | Casey et al. |
| 2006/0089160 A1 | 4/2006 | Othmer |
| 2006/0092015 A1 | 5/2006 | Agrawal et al. |
| 2006/0128397 A1 | 6/2006 | Choti et al. |
| 2006/0197704 A1 | 9/2006 | Luzzatto et al. |
| 2006/0221918 A1 | 10/2006 | Wang |
| 2006/0270421 A1 | 11/2006 | Phillips et al. |
| 2006/0293064 A1 | 12/2006 | Robertson et al. |
| 2007/0004428 A1 | 1/2007 | Morgan et al. |
| 2007/0097511 A1 | 5/2007 | Das et al. |
| 2007/0100955 A1 | 5/2007 | Bodner |
| 2007/0110053 A1 | 5/2007 | Soni et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0178911 A1 | 8/2007 | Baumeister et al. |
| 2007/0184846 A1 | 8/2007 | Horton et al. |
| 2007/0210961 A1 | 9/2007 | Romijn |
| 2007/0232892 A1 | 10/2007 | Hirota |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0033646 A1 | 2/2008 | Morgan et al. |
| 2008/0045234 A1 | 2/2008 | Reed |
| 2008/0133124 A1 | 6/2008 | Sarkeshik |
| 2008/0133336 A1 | 6/2008 | Altman et al. |
| 2008/0139219 A1 | 6/2008 | Boeiro et al. |
| 2008/0176583 A1 | 7/2008 | Brachet et al. |
| 2008/0188242 A1 | 8/2008 | Carlson et al. |
| 2008/0248741 A1 | 10/2008 | Alizadeh-Shabdiz |
| 2008/0248808 A1 | 10/2008 | Alizadeh-Shabdiz |
| 2008/0261622 A1 | 10/2008 | Lee et al. |
| 2009/0075672 A1 | 3/2009 | Jones et al. |
| 2009/0149197 A1 | 6/2009 | Morgan et al. |

(56) References Cited

U.S. PATENT DOCUMENTS

| | | |
|---|---|---|
| 2009/0175189 A1 | 7/2009 | Alizadeh-Shabdiz et al. |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0012784 A1 | 1/2011 | Alizadeh-Shabdiz |
| 2011/0021207 A1 | 1/2011 | Mogan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0178477 A1 | 7/2012 | Morgan et al. |
| 2012/0196621 A1 | 8/2012 | Alizadeh-Shabdiz et al. |
| 2014/0221015 A1 | 8/2014 | Alizadeh-Shabdiz |

FOREIGN PATENT DOCUMENTS

| | | |
|---|---|---|
| WO | WO-2007/101107 | 9/2007 |
| WO | WO-2011/119575 | 9/2011 |
| WO | WO-2011/156549 | 12/2011 |

OTHER PUBLICATIONS

Griswold et al., "ActiveCampus—Sustaining Educational Communities through Mobile Technology." UCSD CSE Technical Report #CS200-0714, 2002, 19 pages.

Hazas, M., et al., "Location-Aware Computing Comes of Age," IEEE, vol. 37, Feb. 2004, pp. 95-97.

Hellebrandt, M., et al., "Estimating Position and Velocity of Mobile in Cellular Radio Network," IEEE Transactions on Vehicular Technology, vol. 46, No. 1, Feb. 1997, pp. 65-71.

International Search Report and Written Opinion of the International Searching Authority, the United States Patent and Trademark Office, for International Application No. PCT/US05/39208, mailed Jan. 29, 2008, 4 pages.

International Search Report and Written Opinion of the International Searching Authority, the United States Patent and Trademark Office, for International Application No. PCT/US2006/045327, dated Jun. 24, 2008, 6 pages.

International Search Report and Written Opinion of the International Searching Authority, the United States Patent and Trademark Office, for International Application No. PCT/US2006/06041, dated Nov. 16, 2007, 4 pages.

International Search Report and Written Opinion of the International Searching Authority, the United States Patent and Trademark Office, for International Application No. PCT/US2006/07299, dated Feb. 11, 2008, 7 pages.

International Search Report and Written Opinion, International Application No. PCT/US07/62721, mailed Nov. 9, 2007, 8 pages.

International Search Report and Written Opinion of the International Searching Authority, the United States Patent and Trademark Office, for International Application No. PCT/US2008/058345, dated Jun. 30, 2008, 7 pages.

International Search Report and Written Opinion, International Patent Application No. PCT/US08/87969, mailed Mar. 10, 2009, 6 pages.

International Search Report and Written Opinion of the International Searching Authority, the United States Patent and Trademark Office, for International Application No. PCT/US2010/045438, dated Oct. 6, 2010, 9 pages.

International Search Report and Written Opinion of the International Searching Authority, the United States Patent and Trademark Office, for International Application No. PCT/US2011/029379, dated Jun. 1, 2011, 15 pages.

International Search Report and Written Opinion of the International Searching Authority, the United States Patent and Trademark Office, for International Application No. PCT/US2011/039717, dated Dec. 20, 2011; 13 pages.

Kawabata, K. et al., "Risks of using AP locations discovered through war driving,"; Pervasive Computing, May 19, 2006, pp. 67-81.

Kim, M., et al., "Estimating Velocity Using Diversity Reception," IEEE, 1994, pp. 371-374.

Kirsner, S., "One more way to find yourself," The Boston Globe, May 23, 2005, Retrieved from www.boston.com, 2 pages.

Krumm, J., et al., "LOCADIO: Inferring Motion and Location from WLAN Signal Strengths," Proc. of Mobiquitous, Aug. 22-26, 2004, 10 pages.

Lamarca, A., et al., "Place Lab: Device Positioning Using Radio Beacons in the Wild,"; Pervasive Computing, Oct. 2004, pp. 116-133.

Lamarca A., et al., "Self-Mapping in 802.11 Location Systems," Ubicomp 2005: Ubiquitous Computing, Aug. 23, 2005, pp. 87-104.

Muthukrishnan, K., et al., "Towards Smart Surroundings: Enabling Techniques and Technologies for Localization," Lecture Notes in Computer Science, vol. 3479, May 2005, 11 pages.

Schilit, et al., "Challenge: Ubiquitous Location-Aware Computing and the"Place Lab Initiative, WMASH'03, Sep. 2003, San Diego, CA, 7 pages.

Supplementary European Search Report for European Application No. 07757413, dated Apr. 6, 2010, 10 pages.

Zhou, R. "Wireless Indoor Tracking System (WITS)," Jul. 2006, retrieved on May 11, 2011 from the internet: <URLhttp://www.ks.uni-freiburg.de/assist/rui/index.php?page=publications>, entire document, 15 pages.

* cited by examiner

ESTIMATING DEMOGRAPHICS ASSOCIATED WITH A SELECTED GEOGRAPHIC AREA

RELATED APPLICATIONS

This application is a continuation of and claims benefit under 35 U.S.C. §120 to U.S. Utility application Ser. No. 14/073,952, entitled Method of and System for Estimating Temporal Demographics of Mobile Users, filed Nov. 7, 2013, which is a a continuation of and claims benefit under 35 U.S.C. §120 to U.S. Utility application Ser. No. 13/252,685, entitled Method of and System for Estimating Temporal Demographics of Mobile Users, filed Oct. 4, 2011, now issued as U.S. Pat. No. 8,606,294 on Dec. 10, 2013, which claims the benefit under 35 U.S.C. §119(e) of the U.S. Provisional Application No. 61/389,834, entitled Method of and System for Estimating Temporal Demographics of Mobile Users, filed Oct. 5, 2010, the contents of all of which are incorporated by reference herein.

BACKGROUND

1. Field

The invention generally relates to finding temporal demographics of anonymous mobile users at different locations and, more specifically, the methods of estimating aggregated temporal demographics of any community of mobile users at any location by aggregating short location sequences (hereafter known as tracks) from individual anonymized users.

2. Description of Related Art

In recent years, the number of mobile and portable computing devices has increased dramatically, and at the same time the number of location-aware applications for such devices has exploded.

Location-based services (LBS) is an emerging area of mobile applications that leverages the ability of new devices to calculate their current geographic positions and report them to a user or to a service. Examples of these services range from obtaining local weather, traffic updates, and driving directions to child trackers, buddy finders and urban concierge services. These new location-aware devices rely on a variety of technologies that all use the same general concept to generate location information. By measuring radio signals originating from known reference points, these devices can mathematically calculate the user's position relative to these reference points.

SUMMARY

Under one aspect of the invention, a method of and system for estimating temporal demographics of mobile users is disclosed.

Under another aspect of the invention, a method of estimating demographic information associated with a selected geographical area based on tracks of travel of a plurality of individuals includes, for each individual of a plurality of individuals, determining a location of an intermediate ending point of a portion of a track of travel of the individual. The intermediate ending point of each track being within a selected geographical area. The method also includes, for each individual of the plurality of individuals, determining a location of an intermediate starting point of the portion of the track of travel of the individual. The intermediate starting point being within a starting geographical area. The method further includes estimating a ratio of individuals transiting into the selected geographical area versus individuals that are residents of the selected geographical area based on a count of the number of tracks having the intermediate ending point within the selected geographical area. The method also includes estimating demographic information associated with the selected geographical area based on the estimated ratio and based on demographic information associated with the starting geographical areas.

Under a further aspect of the invention, the estimating the demographic information associated with the selected geographical area is further based on demographic information associated with residents of the selected geographical area. Under another aspect of the invention, the estimating the ratio and the estimating the demographic information associated with the selected geographical area occurs during a designated time period.

Under still another aspect of the invention, a method of estimating demographic information associated with a selected geographical area based on a track of travel of at least one individual includes, for at least one individual, determining a selected geographical area along a portion of a track of travel of the individual and determining demographic information associated with the at least one individual. The method also includes estimating a ratio of individuals transiting into the selected geographical area versus individuals that are residents of the selected geographical area and estimating demographic information associated with the selected geographical area based on the estimated ratio and based on demographic information associated with the at least one individual.

Under an aspect of the invention, the estimating demographic information associated with the selected geographical area is further based on demographic information associated with residents of the selected geographical area.

Under still other aspects of the invention, systems for estimating demographic information associated with a selected geographical area based on a track of travel of at least one individual include logic for performing the actions recited above. Any of the aspects recited above can be combined with any of the other aspects recited above.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

As used herein, the term "demographics" means statistical data of a population. Demographics or demographic data includes, but is not limited to age, income, education, race, gender, disabilities, mobility (in terms of travel time to work or number of vehicles available), educational attainment, home ownership, employment status, and etc. The statistical data includes average values, mean values, minimum values, maximum values, standard deviance values, and any other statistical measures known to one skilled in the art.

As used herein, the term "track" means a sequence of locations occupied by a single user and/or device and the times at which they were occupied. Thus, a track can represent a path of travel taken by a user.

As used herein, the term "nanotrack" means a portion of a track between two points of the sequence of location estimates that make up the track. A nanotrack can be a repositioning of a user and/or device between two sequential position estimates (or "one hop"), which is the smallest piece of a track.

As used herein, the term "tile" means a portion of an entire geographical area of interest. In other words, the entire geographical area is divided into multiple tiles. Tiles can be small areas defining the resolution of demographics analysis. Tiles can be the same size everywhere or they can be different sizes in different places based on the required demographics resolution. Example of tile size is 400 m by 400 m or between 400 m and 2 km. The tile size can be defined based on population, and/or number of users, and/or required resolution in an area or resolution of available residential demographics, which can cause tile size to vary from one location to another. The tiles can be of any shape, regular or irregular, including, but not limited to, any polygonal shape, circular, oval, etc. Moreover, the shape and extent of the tile can follow political boundaries and can encompass a town, city, county, state, and/or As used herein, the term "time slice" means a portion of a designated amount of time. For example, as described herein, demographics are calculated for each tile, but demographics can also be different within a single tile at different times of the day. Therefore, the entire time (e.g. a day) is "sliced" into pieces, like segments of one hour, or multiples of hours, or a day. Slices of time segments can be equal or can be different in duration.

Figure 1:
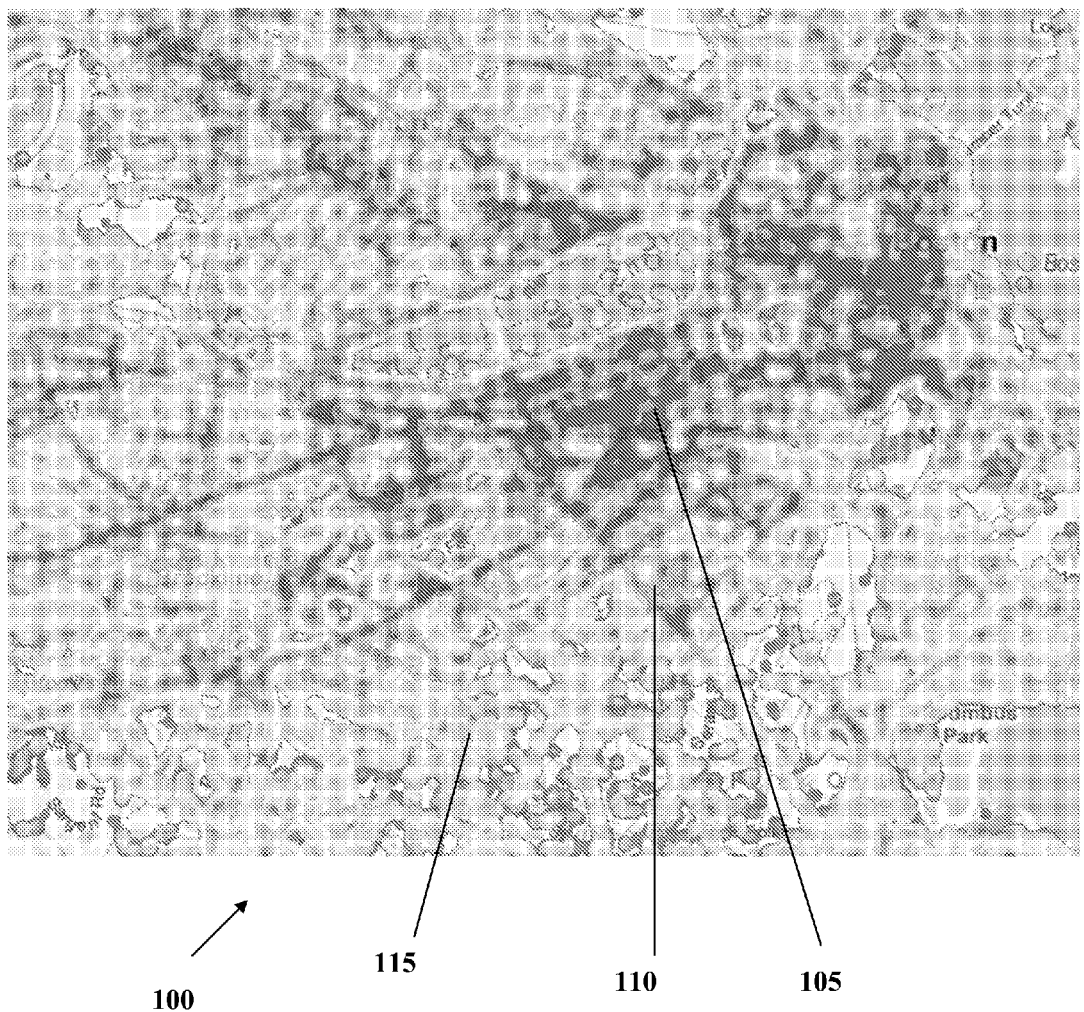
FIG. 1 depicts a visual presentation of LBS requests for a portion of the city of Boston.

As used herein, the term "user" means an LBS user or an individual of a community of interest. FIG. 1 shows an example of density of usage at a specific time in a form of a "heat map" 100, in which a relatively high density of users is shown in darker shaded areas 105, a medium density of users is shown in medium shaded areas 110, and a relatively low density of users are shown in lighter shaded areas 115. As in this figure, identity of users are not known and only the density of users at different times are known.

Under one aspect of the invention, the temporal and spatial demographics of location-based-services (LBS) users are found based on anonymous spatial and temporal density of usage (density of usage quantifies the temporal frequency of location requests emanating from a particular location). It is assumed that the locations of LBS users are known without knowing the users' identities. Although the aggregate of LBS users at different times and different locations is known, there is no user's identification included in the location information and, therefore, individual user demographics are not available. Moreover, because of privacy concerns, the "long tracks" of locations of users are not made available.

Preferred embodiments of the invention provide a method to find the above described demographics by defining a system, which is initialized with aggregate demographics describing the residents of each tile for each time slice which are supplied by a third party such as the U.S. Census Bureau.

Then nanotracks are used to extract time-varying demographics caused when users travel outside of the tiles in which they reside. Specifically, a nanotrack leaving a particular tile represents an abstracted individual whose demographics are the average of the origin tile at the moment when the track left the tile. There is no differentiation between users within a given tile at a given time, so users retain anonymity. Anonymity can be defined as K-anonymity, which means only tiles with more than K number of users at a given time slice is considered in the system.

The location of the LBS user is determined using any positioning technology or methodology, e.g., satellite based positioning systems (for example GPS or Galileo), WiFi positioning systems, cell positioning systems, a hybrid satellite-based and WiFi-based positioning system, and/or entered manually.

In general, this aspect of the invention enables one to find temporal demographics of a community at different locations, in which the aggregate of the density of the members of a community in different locations and at different times is known. In other words, temporal demographics of a community at different locations are found based on the demographic of the community from different places and at different times. The aggregate location of members of the community is known without knowing the demographics of individual members. There is also no track of individual members of the community, from which demographics of individual users can be extracted. In other words, each location shows that a member of the community was in that location at that time without knowing exactly which user.

Extended Location:

Under another embodiment, the current location of a user is associated with a previous location of the user. A user's previous location refers to the last time that the location of the user was determined, and in some implementations, it is the location associated with the most recent time that the user used LBS. By doing this, both the current location of a user and the time of usage are known to the system as well as the previous location of the user at the corresponding time.

In one implementation, associating a previous location with a current location is done on the user's device. In other implementations, the aforementioned associating actions occur on a location server. The user's device can associate the current location with the previous location, or the user can have a unique user identification only for a short period time, and the user identification will change after expiration of a defined period. In this case, the user's track for the period of time during which the unique identification was used is known to the system. During this time, the recorded track information will include one or more locations records. Even in this usage scenario, users are still anonymous, and only the current location (and associated time) and the immediately previous location are known. In other words, in this usage case, a small trace of user's track is known.

By knowing the current location and the previous location of a user, one hop of user's track is known, but not the whole track. As set forth above, one hop of the whole track is termed nanotrack herein. A nanotrack is a small part of a user's track, but the entire track of the user movement cannot be rebuilt from nanotracks since there is no user identification attached to nanotracks. Thus, embodiments of the invention prevent the tracking of users based on the collection of nanotracks because each nanotrack merges with other nanotracks arriving at the same location. In other words, an individual user is lost in the crowd. Obviously, there will be no previous location attached to the current location, when no previous location exists.

Figure 3:
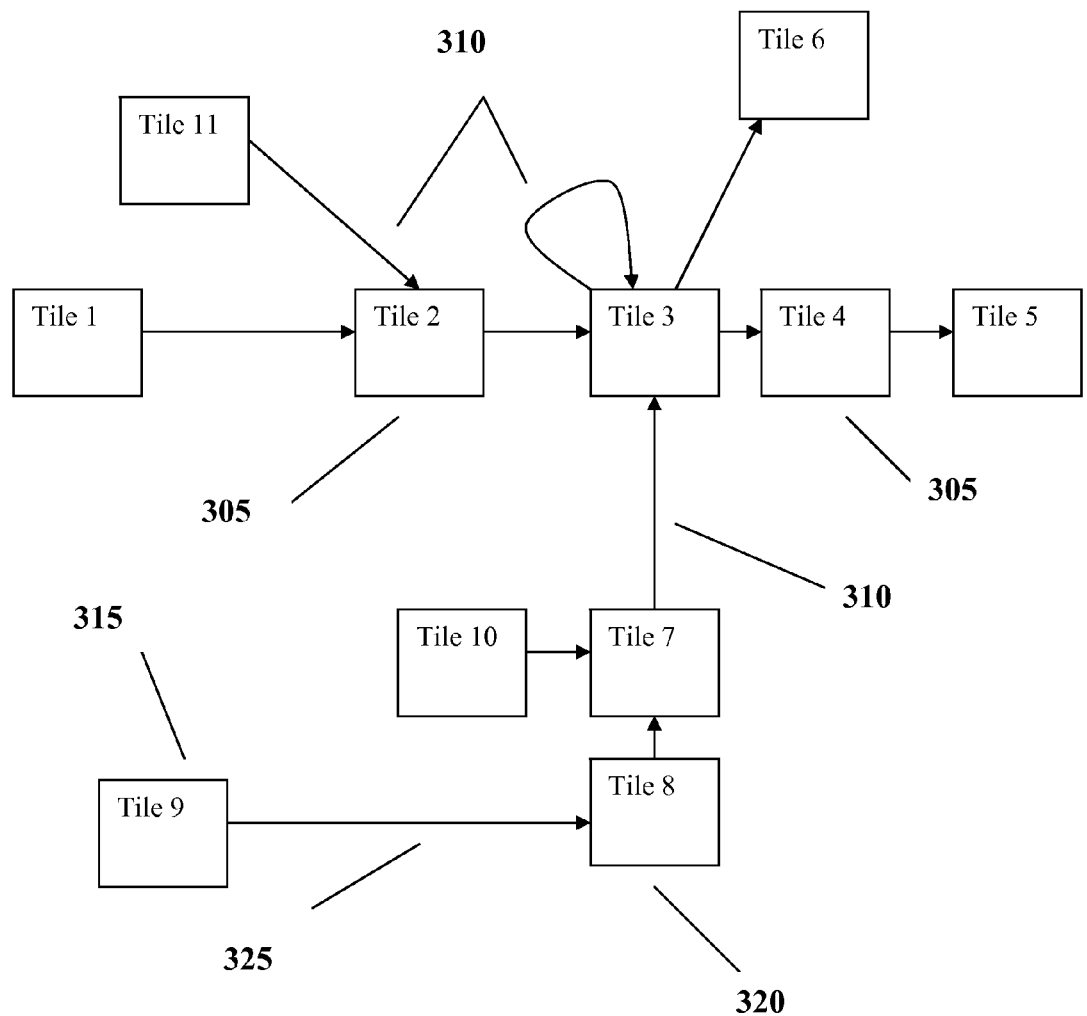
FIG. 3 depicts a set of tiles and transition of users from one tile to another tile, and it shows users aggregate at some points and disperse from that point again to other tiles.

FIG. 3 shows an example of nanotracks. The rectangles 305 (entitled "Tile") represent tiles, and the arrows show nanotracks 310, which start in one tile and end in another tile. For example, a user in Tile 9 requests a location determination at a first point in time 315. The next request for a location determination from the same user occurs in Tile 8 at a later time 320. Thus, nanotrack 325 is formed from this series of location determinations.

Illustrative Procedure to Find Demographics:

In one embodiment of the invention, demographics of aggregate anonymous usage at different locations and at different times are determined based on the flow of users between different locations and demographics associated with selected areas (e.g., residential areas).

In one implementation, the techniques disclosed herein are applied when nanotrack for a given percentage of the total number of system users are known. In such a case, the percentage of user for which nanotracks are known become a statistical representation of the entire group of users.

Figure 5:
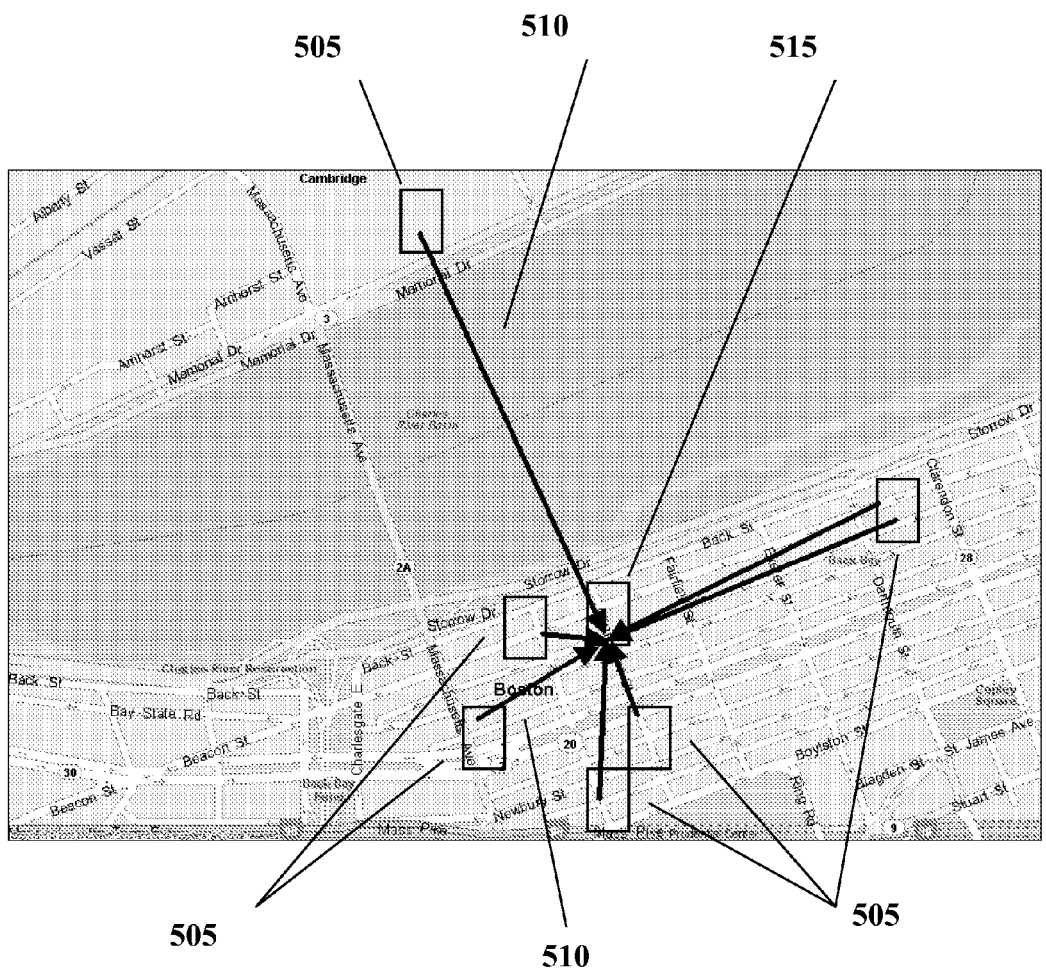
FIG. 5 depicts an example of transitions of users from different locations and different tiles to a given tile.
Figure 6:
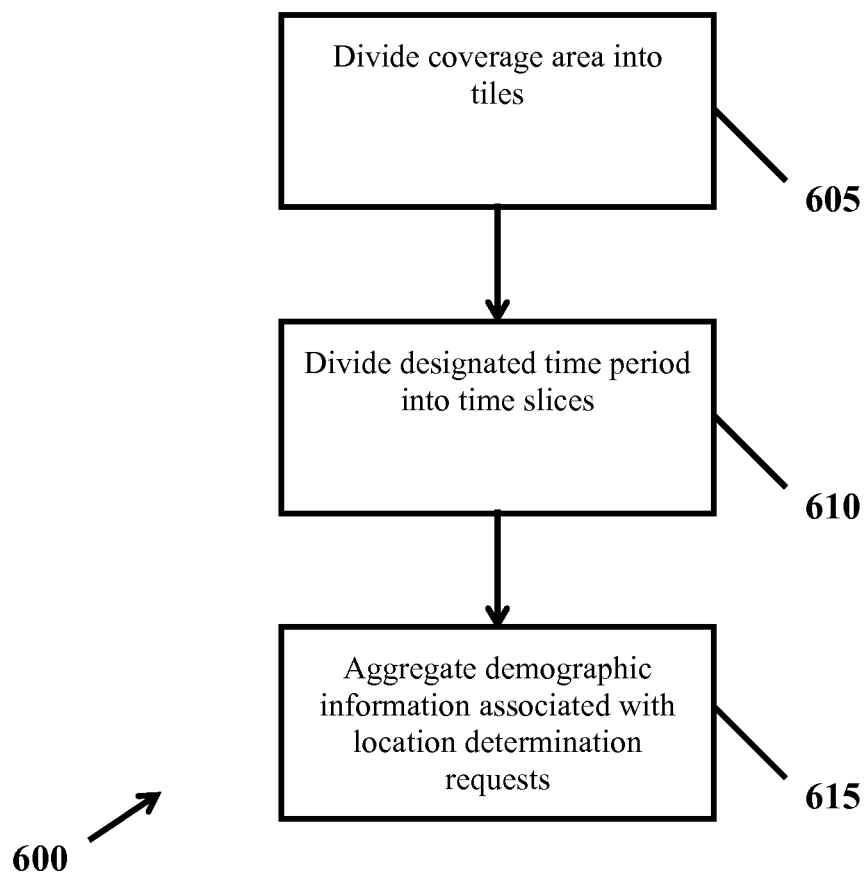
FIG. 6 depicts an overview of a process for estimating temporal demographics.

The following description is an illustrative implementation of the techniques for determining the aggregate demographics of a collection of users for a given location at a given time. FIG. 5 shows an example of transitions of users from different locations and different tiles to a given tile. Meanwhile, FIG. 6 shows an overview of a method 600 of determining the aggregate demographics of a collection of users for a given location at a given time. A portion of a coverage area 500 is divided into tiles 505 (only a few rectangular tiles are labeled) (step 605). Tiles can have different sizes and/or shapes, or the tiles' size and/or shape can change adaptively. Moreover, in certain implementations, all tiles within a particular area have the same size and shape, as explained above. The tiles 505 shown with rectangular boxes in FIG. 5 are of the same size and shape.

Next, a designated period of time of interest is sliced into smaller segments (step 610). In some implementations, the time slices are of equal size. In other implementations, the lengths of the time slices vary. Each time slice is one hour over a period of one day is set forth in this illustrative example. However, other time slice durations are within the scope of the invention, e.g., multiple hours or a day, one or more days of a week, etc. Finally, demographic information associated with a number of location determination requests is aggregated at the tile level for each segment of time (step 615).

Figure 4:
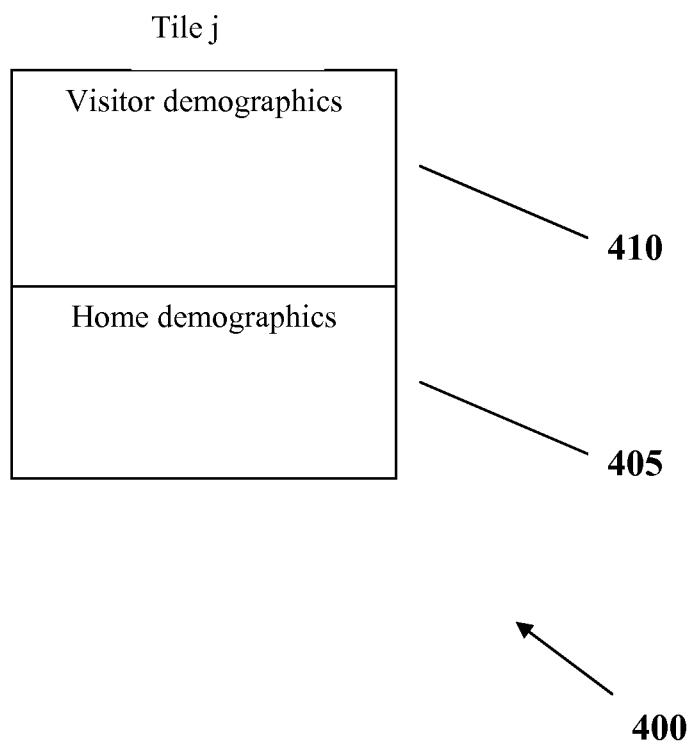
FIG. 4 depicts demographics of a tile is divided to two parts, which are home demographics and visitor demographics.

The act of aggregating the demographic information (step 615) is based on the fact that the aggregate temporal demographics of a tile during a time slice derives from two parts. One part is demographics of residents of the tile, and the second part is demographics of users who have come to this tile from other tiles during that time slice. The first part is termed "home demographics" herein, and the corresponding location estimation requests of those associated with home demographics "home requests". The second part is termed "visitor demographics" and the corresponding location estimation requests associated with visitor demographics are called "visitor requests". Demographics of users residing in the tile are taken from demographic information associated with the geographical area of the home area. For example, census data in the U.S.A. provides a good estimate of the demographics of residents of different geographical locations in U.S.A. FIG. 4 shows one tile 400, the total location requests of which are divided to two parts, home demographics 405 and visitor demographics 410.

Figure 2:
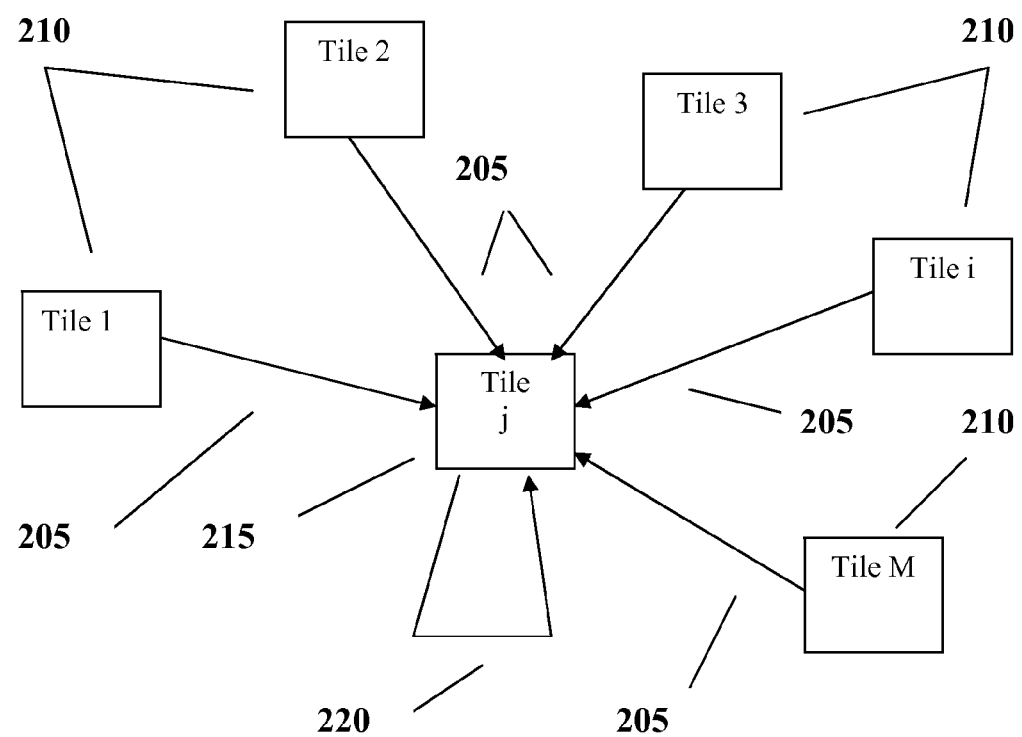
FIG. 2 depicts nanotracks and transitions from different tiles, including the same tile.

FIG. 2 depicts nanotracks 205 (transitions between tiles), including the same tile. Considering all users of the LBS system within a tile at a given time, nanotracks 205 show a user's movement from one location (e.g., tile 210) to the next (e.g., 215). In other words, the nanotracks 205 show from which tile the users transitioned before moving into the tile of interest (tile 215). The number of nanotracks from tile j at time t' to tile k at time t is shown with $T_{jk}(t',t)$. Some users may have a nanotrack 220 from the same tile. In other words, a nanotrack from one time slice of a tile to another time slice of the same tile is also occurs. FIG. 5 depicts an example of nanotracks 510 for one tile 515 in Boston for an hour on Monday morning between 8 am and 9 am. Nanotracks 510 are shown with arrows, which start from previous location of a user (tile 505) and point to the new location of the user (tile 515) determined based on location requests.

The ratio of the residential population to the expected population that travels to a given tile during a particular time slice is used as an estimate for ratio of home requests to visitor requests. This ratio of residential population to the expected population traveled to a tile can be estimated by, for example, (a) residential to commercial land used and/or (b) residential to commercial foot-print of real estate. Meanwhile, the ratio of the residential population to the expected population (residents and visitors) of a tile is shown as "R" here. The ratio of home requests to total requests is a function of time, and it is different at different times of day or night. Thus, the ratio R will, in some instances, have different values within different time slices of the time period of interest. The ratio R will vary from 1 to 0.

The demographics of the users making home requests are considered to be the same as the demographics of the residents of the tile. Not only residents, but also their associates (guests and visitors) are assumed to have the same demographics as the residents (unless other demographic information is available for a particular guest or visitor), which, in turn, is the same as the residents of the tile. One way of determining the demographics of residents of tiles is using demographics information that is available through wide data collection of demographics data by governments, e.g., census data in the U.S.A. Residence demographics is represented by "D" herein. Therefore, home requests demographics is going to be "D", and the demographic information is treated as constant in between updates of the underlying demographic data (e.g., census date updates).

Thus, demographics of a given tile is determined as follows:

$$R(t)D+[1-R(t)]X(t)$$

In the equation above, X(t) is the unknown demographic component of those users who traveled to the tile from other tiles at time t (t refers to a time slice) and who made a location determination request.

The total number of nanotracks to tile k at time slice of t, $T_k(t)$, can be written as follows:

$$T_k(t) = \sum_{t'=t1}^{t'=t_{Nt}} \sum_{j=1}^{j=M} T_{jk}(t',t)$$

In which total number of tiles is M, and Nt is total number of time slices.

Therefore, visitor demographics of tile k, Xk(t) can be found as follows:

$$X_k(t) = \sum_{t'=t1}^{t'=t_{Nt}} \sum_{j=1}^{j=M} \frac{T_{jk}(t', t)}{T_k(t)}[R_j D_j + (1-R_j)X_j(t')]$$

which means the demographics of visitors of tile k is the sum of the demographics of the users that moved from other tiles to tile k according to the ratio of users moved from those tiles relative to all the users moved to tile k. The ratio of residents to people traveling to a tile can be a function of time as well.

Considering all the tiles, there will be one unknown X(t) for each time slot of the tile and also there will be an equation to calculate X(t) for each time slot of the tile. For example, if the number of time slots is $N_t$, there will be M times $N_t$ number of unknowns and also M times $N_t$ number of equations. From this follows the equation below.

$$X_k(t) = \sum_{t'=t_1}^{t'=t_{Nt}} \sum_{j=1}^{j=M} \frac{T_{jk}(t', t)}{T_k(t)}[R_j D_j + (1-R_j)X_j(t')],$$

$$k \in [1, M], t \in [t_1, t_{Nt}]$$

The above equation can also be re-written as follows below.

$$M \begin{cases} X_1(t) = \sum_{t'=t_1}^{t'=t_{Nt}} \sum_{j=1}^{j=M} \frac{T_{j1}(t', t)}{T_1(t)}[R_j D_j + (1-R_j)X_j(t')] \\ X_2(t) = \sum_{t'=t_1}^{t'=t_{Nt}} \sum_{j=1}^{j=M} \frac{T_{j2}(t', t)}{T_2(t)}[R_j D_j + (1-R_j)X_j(t')] \\ \vdots \\ X_M(t) = \sum_{t'=t_1}^{t'=t_{Nt}} \sum_{j=1}^{j=M} \frac{T_{jM}(t', t)}{T_M(t)}[R_j D_j + (1-R_j)X_j(t')] \end{cases}, t \in [t_1, t_{Nt}]$$

The techniques disclosed herein were set forth relative to user requests for LBS applications. However, the approach can be applied to any community of users or a group of users for which an analysis is desired. User location estimations can be collected through voluntary use of a positioning system or can be automatically collected. In other words, the method can be applied to any community with known temporal density in the geographical area of interest with nanotracks.

The techniques described were also concerning only one previous location. However, the idea can be extended to include more than one previous position. Previous locations can be appended to the current location, optionally, with a limitation on the maximum number of previous locations used. Thus, a maximum number (which can be predefined) of past known locations can be appended to the current location. The last location can also be appended to the current location with as many previous locations as possible within a time limit. In such an implementation case, more than one hop of the user track is known and the same method can be applied. In such a case, each hop can be treated as a nanotrack. When more than one hop of a track is known, demographics of multiple hops can be tied together, because they are coming from the same user.

In one implementation, when multiple hops of a track are available, the demographics of a request from a tile can be used for the entire track for that user. For example, the tile supplying the demographics use for each hop of the track can be a user's residence. A tile can be considered as the location of user's residence based on an R-value. For example, a tile with the highest R-value is considered the user's residence. Optionally, to be considered the user's residence, the R-value must be higher than a given threshold. Alliteratively, a tile can be considered as the location of user's residence based on an R-value and the time of a location estimation request. For example, if an R-value is relatively high, and the location estimation request is made at night time or during a weekend, the tile can be considered the user's residence. Further still, a tile can be considered the user's residence tile if a location estimation request was located in an all-residential tile or if a request was located in a tile at the night time, and an R value during the night time for the tile indicates it is a residential tile.

Because embodiments of the invention are not limited to nanotracks, it can be helpful to think of points along the entire track as intermediate starting and intermediate ending points. In other words, although the user may make a series of 10 location estimates associated with his or her movements during a given time period, the third location estimate can be designated as the intermediate starting point, and the seventh location estimate can be designated as the intermediate ending point. Thus, if the usage case dictates, the demographics of the tile in which intermediate starting point occurs (i.e., the third location estimate) can be used as the user's demographic information. Similarly, this demographic information can be applied to the tile in which the intermediate ending point occurs (i.e., the seventh location estimate) using the techniques disclosed herein.

Implementations of the described techniques can be employed on, for example, a WiFi-based Positioning System (WPS) and/or satellite positioning system that has been deployed on tens of millions of devices. For example, many mobile computing devices and smartphones have WPS and/or GPS capabilities. Moreover, tens of thousands of applications available for use on the mobile computing devices and/or smartphones have aspects that rely on the user's location. Thus, user location requests that are generated by these devices and/or applications can be collected to create a density of users in an area of interest, which can be the entire world. The locations of these users are associated with their previous locations to create nanotracks of users (based on the location determination requests). The techniques disclosed herein can then be used to generate temporal demographics about selected geographic areas.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention. The location estimate, source demographic data, and/or temporal demographic data can be displayed on the mobile device and/or transmitted to other devices and/or computer systems. Any or all of the actions for determining the temporal demographic data can be performed on the mobile device. Also, any or all of the actions for determining the temporal demographic data can be performed on a server system remote from the mobile device based on location determination information about the mobile device. Further, it will be appreciated that the scope of the present invention is not limited to the above-described embodiments, but rather is defined by the appended claims; and that these claims will encompass modifications of and improvements to what has been described.

What is claimed is:

1. A method of estimating demographics associated with a selected geographic area, comprising:
   for each mobile device of a plurality of mobile devices, associating a more recent location estimate of the mobile device determined by a positioning system that is within the selected geographic area with a previous location estimate of the mobile device determined by the positioning system, and determining an origin geographic area that includes the previous location estimate;
   estimating demographics associated with the selected geographic area, by a computer system, based at least in part on demographics associated with the origin geographic areas of the plurality of mobile devices; and
   transmitting the estimated demographics to at least one other computer system.

2. The method of claim 1, further comprising:
   dividing a coverage area of the positioning system into a plurality of geographic areas, wherein the selected geographic area and the origin geographic areas are ones of the plurality of geographic areas.

3. The method of claim 2, wherein the plurality of geographic areas each have a same size and shape.

4. The method of claim 1, further comprising:
   dividing a designated time period used for estimating the demographics associated with the selected geographic area into a plurality of time slices,
   wherein the more recent location estimates were performed during a different time slice than the previous location estimates of the plurality of mobile devices.

5. The method of claim 4, wherein the estimated demographics are associated with a time slice during which the more recent location estimates were performed.

6. The method of claim 1, wherein the more recent location estimate and the previous location estimate of a given mobile device of the plurality of mobile devices form a portion of a sequence of location estimates for the given mobile device.

7. The method of claim 6, wherein the previous location estimate of the given mobile device is immediately prior to the more recent location estimate of the given mobile device in the sequence of location estimates of the given mobile device.

8. The method of claim 1, wherein the positioning system comprises a WiFi-based positioning system.

9. The method of claim 1, wherein the demographics associated with the origin geographic areas of the plurality of mobile devices are visitor demographics, and the estimating demographics associated with the selected geographic area is based on a combination of the visitor demographics and home demographics of one or more mobile devices whose users are residents of the selected geographic area.

10. The method of claim 9, further comprising:
    combining the home demographics and the visitor demographics according to a ratio of mobile devices transiting into the selected geographic area versus mobile devices whose users are residents of the selected geographic area.

11. A method of estimating demographics associated with a selected geographic area, comprising:
    identifying a plurality of mobile devices that are within the selected geographic area based on location requests from the plurality of mobile devices to a positioning system;
    determining home demographics associated with one or more of the plurality of mobile devices whose users are residents of the selected geographic area;
    determining visitor demographics associated with one or more of the plurality of mobile devices whose users are transiting into the selected geographic area, the determining visitor demographics performed at least in part by
       determining an origin geographic area of each of one or more of the mobile devices whose users are transiting into the selected geographic area, and
       obtaining demographics associated with each origin geographic area;
    estimating demographics associated with the selected geographic area, by a computer system, based on a combination of the home demographics and the visitor demographics; and
    transmitting the estimated demographics to at least one other computer system.

12. The method of claim 11, wherein the estimating further comprises:
    determining a ratio of the mobile devices transiting into the selected geographic area versus the mobile devices whose users are residents of the selected geographic area; and combining the home demographics and the visitor demographics according to the ratio.

13. The method of claim 11, wherein the positioning system comprises a WiFi-based positioning system.

14. A non-transitory computer readable medium storing instructions for estimating demographics associated with a selected geographic area, the instructions when executed on one or more processors operable to:
   for each mobile device of a plurality of mobile devices,
      associate a more recent location estimate of the mobile device determined by a positioning system that is within the selected geographic area with a previous location estimate of the mobile device determined by the positioning system, and
      determine an origin geographic area in which the previous location estimate was located; and
   estimate demographics associated with the selected geographic area based at least in part on demographics associated with the origin geographic areas of the plurality of mobile devices.

15. The non-transitory computer readable medium of claim 14, wherein the instructions when executed are further operable to:
   divide a coverage area of the positioning system into a plurality of geographic areas, wherein the selected geographic area and the origin geographic areas of the plurality of mobile devices are ones of the plurality of geographic areas.

16. The non-transitory computer readable medium of claim 14, wherein the instructions when executed are further operable to:
   divide a designated time period used for estimating the demographics associated with the selected geographic area into a plurality of time slices,
   wherein the more recent location estimates were performed during a different time slice than the previous location estimates of the plurality of mobile devices.

17. The non-transitory computer readable medium of claim 14, wherein the more recent location estimates and the previous location estimate of a given mobile device of the plurality of mobile devices form a portion of a sequence of location estimates for the given mobile device.

18. The non-transitory computer readable medium of claim 17, wherein the previous location estimate of the given mobile device is immediately prior to the more recent location estimate of the given mobile device in the sequence of location estimates of the given mobile device.

19. The non-transitory computer readable medium of claim 14, wherein the positioning system comprises a WiFi-based positioning system.

20. The non-transitory computer readable medium of claim 14, wherein the demographics associated with the origin geographic areas of the plurality of mobile devices are visitor demographics, and the estimating demographic information associated with the selected geographic area is based on a combination of the visitor demographics and home demographics of one or more mobile devices whose users are residents of the selected geographic area.

21. A system comprising:
   software executable on a plurality of mobile devices configured to collect location determination requests and utilize a positioning system to produce location estimates of the mobile devices; and
   a server configured to receive the location estimates of the plurality of mobile devices from the positioning system and based thereon to:
      for each mobile device of the plurality of mobile devices,
         associate a more recent location estimate of the mobile device that is within a first geographic area with a previous location estimate of the mobile device,
         determine an origin geographic area that includes the previous location estimate, and
      estimate demographics associated with the first geographic area based at least in part on demographics associated with the origin geographic areas of the plurality of mobile devices.

22. The system of claim 21, wherein the positioning system comprises a WiFi-based positioning system.

* * * * *